United States Patent [19]
Ziemann

[11] Patent Number: 5,933,553
[45] Date of Patent: Aug. 3, 1999

[54] ARRANGEMENT FOR TRANSMITTING AND RECEIVING OPTICAL SIGNALS

[75] Inventor: Olaf Ziemann, Berlin, Germany

[73] Assignee: Deutsche Telekom AG, Bonn, Germany

[21] Appl. No.: 09/064,435

[22] Filed: Apr. 22, 1998

[30] Foreign Application Priority Data

Apr. 22, 1997 [DE] Germany .......................... 197 16 838

[51] Int. Cl.⁶ ...................................................... G02B 6/28
[52] U.S. Cl. ................. 385/24; 385/27; 385/39; 385/31; 359/154; 359/109
[58] Field of Search ................... 385/24, 36, 46, 385/27, 28, 31, 37, 39, 48, 22, 23; 359/109, 152–154, 889, 891

[56] References Cited

U.S. PATENT DOCUMENTS 5,757,277  5/1998  Kobayashi ........................... 359/154
5,809,187  9/1998  Peck, Jr. et al. ....................... 385/24

*Primary Examiner*—Phan Palmer
*Attorney, Agent, or Firm*—Kenyon & Kenyon

[57] ABSTRACT

An arrangement for the bidirectional transmission and receiving of optical signals. At least one transmitting device and at least one receiving device, and an optical fiber for transmitting the optical signals are described. Provision is made for the at least one transmitting device and the at least one receiving device to be assigned directly to an effective optical area of the optical fiber. A filter for blocking optical signals having a wavelength from an associated transmitting device is also described.

11 Claims, 2 Drawing Sheets

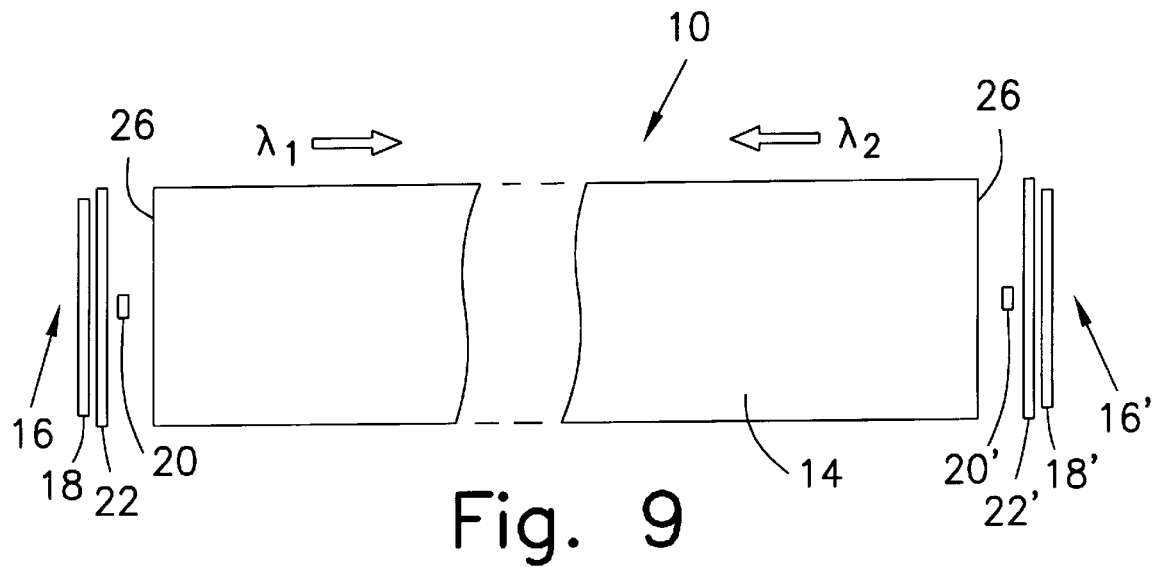
Fig. 9
Fig. 9a
Fig. 9b
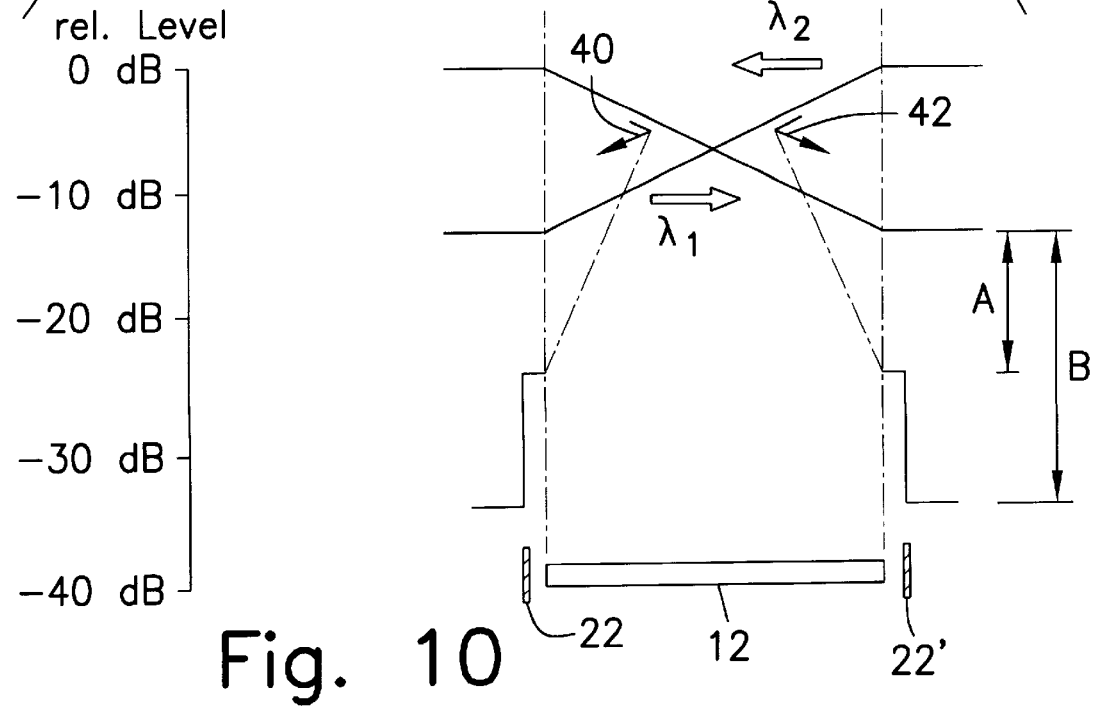
Fig. 10

ARRANGEMENT FOR TRANSMITTING AND RECEIVING OPTICAL SIGNALS

FIELD OF THE INVENTION

The present invention relates generally to an arrangement for transmitting and receiving optical signals, and in particular to an arrangement in which a transmitting device and a receiving device are assigned directly to an effective area of an optical fiber.

RELATED TECHNOLOGY

Devices for transmitting and receiving optical signals over a transmission route are known. For this purpose, provision is made for at least one optical fiber, each end of which is provided with at least one transmitting device and at least one receiving device. A device of this kind enables a bidirectional transmission of data. Both single-mode and multi-mode optical fiber systems can be used for bidirectional transmission of data. Either one wavelength or a plurality of different wavelengths can be used to transmit the signals. To separate the bidirectional signals, special optical components, such as beam-splitting couplers having downstream filters or wavelength-dividing couplers are known. Inherent disadvantages of these known arrangements include the additional space required for the special optical components and the relatively high power losses due to the attenuation effect of the special optical components.

SUMMARY OF THE INVENTION

An object of the present invention is to create an arrangement for transmitting and receiving optical signals which is simple in design, functions reliably, and is characterized by relatively low power losses.

The present invention therefore provides an arrangement for the bidirectional transmission and receiving of optical signals, comprising at least one transmitting device and at least one receiving device, and an optical fiber for transmitting the optical signals, characterized in that the transmitting device (20) and the receiving device (18) are directly assigned to an effective optical area (26) of the optical fibers (14).

Because the transmitting device and the receiving device are directly assigned to an effective optical area of the optical fiber, there is no need to interconnect additional, special optical components. It is possible, particularly when working with optical fibers having a relatively large cross-section, to couple the transmitting device and the receiving device directly into an end face of the optical fiber, since known components for transmitting and receiving optical signals, such as laser diodes or super-luminescence diodes, have a relatively small size that does not exceed the cross-section of the optical fiber. Because the cross-section of the effective optical area of the optical fiber is greater than the sum of the cross-sections of the effective optical areas of the transmitting device and of the receiving device, an uncritical launching of the optical signals to be transmitted can be easily attained, as can the directivity required for a bidirectional transmission.

The cross-section of the effective optical area of the receiving device can also be similar in size or larger than the optical effective area of the optical fiber, since here there can be no adverse effect on a launching of the signals.

Other advantageous embodiments of the present invention include:

(a) that an end face of the optical fibers (14) is used as an effective optical surface (26);

(b) that the transmitting device (20) is positioned in a cut-out (32) of receiving device (18);

(c) that the transmitting device (20) is positioned in a preferably centrical, circular cut-out (34) of receiving device (18);

(d) that the optical fiber (14) is a single-mode fiber;

(e) that the optical fiber (14) is a multi-mode fiber;

(f) that the optical fiber (14) is an optical polymer fiber; and (g) that a diameter of the optical fiber (14) is about 1 mm.

One advantageous refinement of the present invention provides for the transmitting device and the receiving device to be positioned side by side. The active optical surface of the optical fiber is in this way divided into one region for the receiving device and one region for the transmitting device, without adverse consequences to the effectiveness of the arrangement. The unusable active optical surface of the optical fiber can be kept relatively small by adapting the cross-sections of the receiving device and of the transmitting device in an optimized manner.

In another refinement of the present invention, the receiving device and the transmitting device are arranged one in front of the other. The transmitting device is disposed between the active optical area of the optical fiber and of the receiving device. This limits the optically inactive area (loss area) of the receiving device to the optically effective area of the transmitting device. As a result, the optical fiber's cross-section can be optimally utilized. Any power degradation due to the transmitting device being disposed in front of the receiving device is negligible.

When applied to a bidirectional operation using multi-mode optical fiber systems, one embodiment of the invention provides for a filter to be assigned to the receiving device. The optically effective cross-sectional surface of the filter is adapted to the receiving device. Without substantial additional outlay, a wavelength division multiplex (WDM) operation can thus be achieved to enhance the dynamics of the entire arrangement.

BRIEF DESCRIPTION OF THE DRAWINGS

The present invention will be elucidated on the basis of exemplary embodiments, with reference to the figures in which:

FIG. 9 shows a schematic overall view of an arrangement of the present invention;

FIG. 9a shows a graph of the transmittance of filter 22 in FIG. 9;

FIG. 9b shows a graph of the transmittance of filter 22' in FIG. 9; and

FIG. 10 shows a schematic graph representation of the relative signal levels of the arrangement shown in FIG. 9.

DETAILED DESCRIPTION

Figure 1:
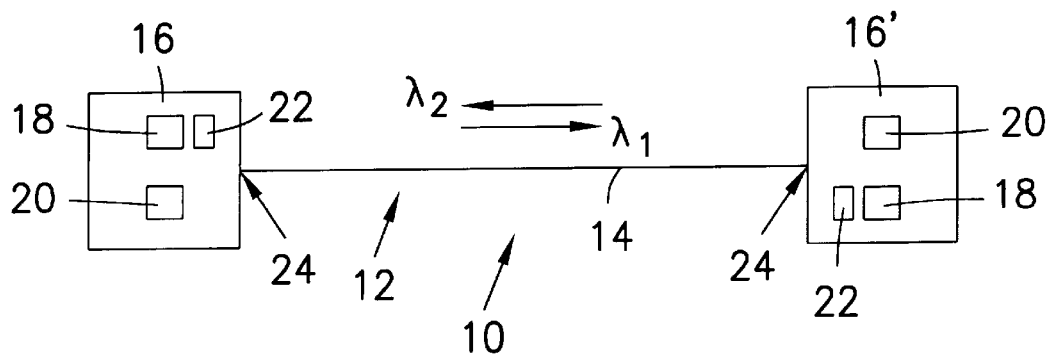
FIG. 1 shows a schematic overall view of an arrangement for the bidirectional transmission of optical signals.

FIG. 1 shows schematically an overall view of an arrangement 10 for the bidirectional transmission of optical signals. Arrangement 10 comprises a transmission route 12, which is formed by an optical fiber 14. Optical fiber 14 can be, for example, a single-mode optical fiber or a multi-mode optical fiber. An optical polymer fiber having a diameter of 1 mm may, for example, be used. A transceiver 16 is arranged at each end point of transmission route 12. Each transceiver 16 comprises a receiving device 18 and a transmitting device 20. Bidirectional transmission of optical signals may be effected either with one wavelength, or with multiple wavelengths—a so-called wavelength division multiplex (WDM).

When using different wavelengths, including for transmission in the forward and reverse directions, receiving devices 18 can have an optical filter 22 assigned to them, which blocks a wavelength of its associated transmitting device. This enhances the dynamic performance of the optical signal transmission, since so-called near-end crosstalk is reduced.

Figures 2, 3, 4:
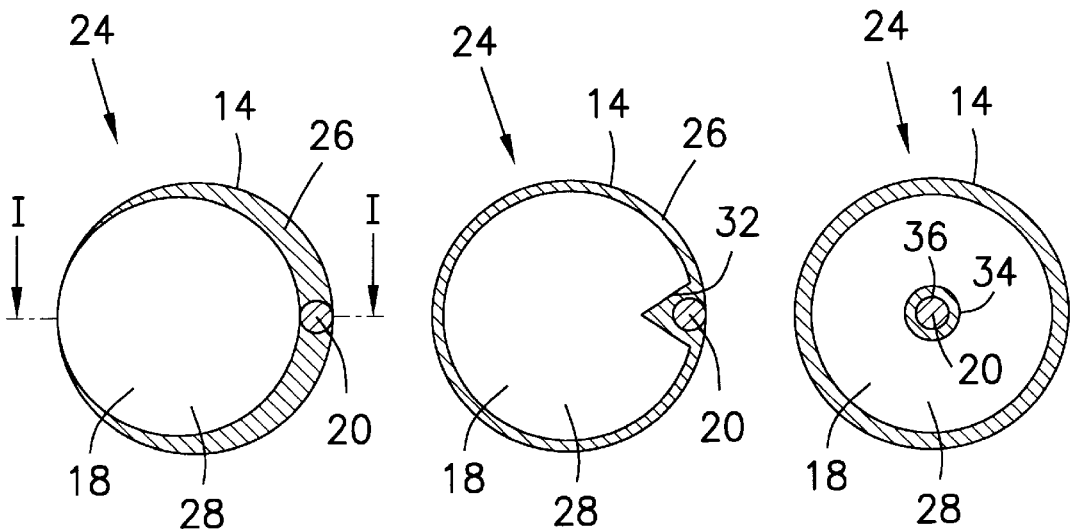
FIG. 2 shows a schematic front view of a coupling site in one embodiment of the present invention.
FIG. 3 shows a schematic front view of coupling sites in another embodiment of the present invention.
FIG. 4 shows a schematic front view of a coupling site in another embodiment of the present invention.

Referring now to FIGS. 2–4, a coupling site 24 is located between optical fiber 14 and each transceiver 16. FIGS. 2–4 each show a plan view of coupling site 24 viewed from a transceiver 16 in the direction of optical fiber 14.

Referring specifically to FIG. 2, receiving device 18 and transmitting device 20 are arranged opposite an end face of optical fiber 14. A pin photo diode is used, for example, as a receiving device 18, and a laser diode as a transmitting device 20. Receiving device 18 and transmitting device 20 have effective optical areas 28 and 30, respectively, covering a portion of effective optical area 26 of the end face of optical fiber 14. The sum of areas 28 and 30 is less than the effective optical area 26. Because receiving device 18 and transmitting device 20 are quasi covered, side by side, by effective optical area 26 of optical fiber 14, a launching of the optical signals, whether from transmitting device 20 into optical fiber 14 or from optical fiber 14 into receiving device 18, is not critical. Since receiving device 18 essentially covers the entire effective optical area 26 of optical fiber 14, it receives virtually all the incoming power. The inactive, or loss, area which results from the difference between effective optical area 26 of optical fiber 14 and area 28 of receiving device 18, is negligibly small.

FIGS. 3 and 4 show other embodiments having different arrangements of receiving device 18 and transmitting device 20. In accordance with FIG. 3, effective optical area 28 of receiving device 18 is further adapted to effective optical area 26 of optical fiber 14. Receiving device 18 has a cut-out 32, used for configuring transmitting device 20. The arrangement illustrated in FIG. 3 makes it possible to further reduce the difference between effective optical area 26 of optical fiber 14 and of effective optical area 28 of receiving device 18. The power loss of the optical signals being transmitted is again minimized.

The arrangement shown in FIG. 4 enables a further minimization of this power loss. In this embodiment of the present invention, receiving device 18 is provided with a preferably circular cut-out 34. Transmitting device 20 is preferably disposed in the center of cut-out 34. Only a narrow gap 36 exists between receiving device 18 and transmitting device 20. The inactive area is determined by the diameter of cut-out 34.

Figures 5, 6, 7, 8:
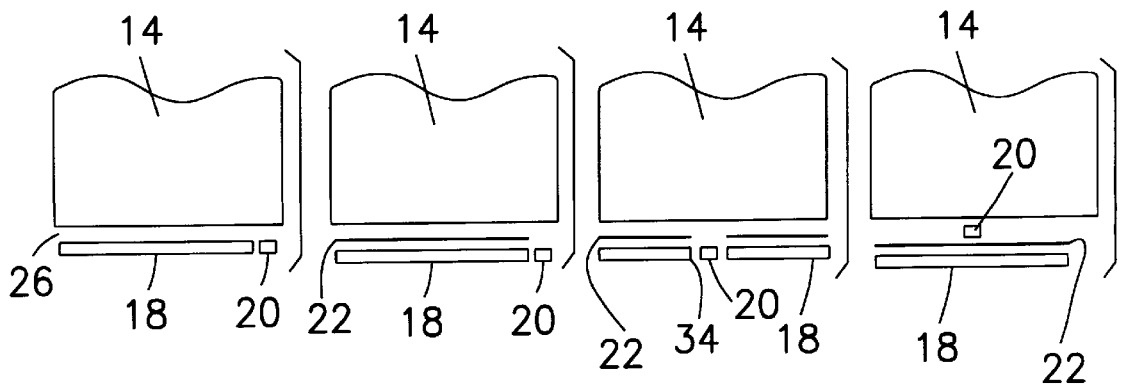
FIG. 5 shows a schematic plan view of the coupling site shown in FIG. 2.
FIG. 6 shows a schematic plan view of the coupling site shown in FIG. 3.
FIG. 7 shows a schematic plan view of the coupling site shown in FIG. 4.
FIG. 8 shows a schematic plan view of a coupling site in an embodiment of the present invention in which the transmitting and receiving devices are positioned one in front of the other.

FIGS. 5 through 7 show plan views of coupling site 24 along line of intersection I/I in accordance with FIGS. 2 through 4. Referring now to FIG. 5, which shows the plan view in accordance with FIG. 2, it is apparent that receiving device 18 and transmitting device 20 are disposed opposite effective optical surface 26, in this case the end face of optical fiber 14.

In accordance with the exemplary embodiment shown in FIG. 6, an associated filter 22 is additionally configured between receiving device 18 and optical fiber 14. Filter 22 is engineered to allow the passage of optical signals having wavelength $\lambda_2$ from oppositely disposed transceiver 16'. Optical signals having the wavelength $\lambda_1$ from the filter's associated transmitting device 20 are blocked. As a result, optical signals transmitted by transmitting device 20 which are reflected back from optical fiber 14, in particular from effective optical surface 26, do not reach the associated receiving device 18. This reduces any so-called near-end crosstalk.

FIG. 7 depicts a plan view of the arrangement in accordance with FIG. 4. In this embodiment filter 22 is provided with a cut-out 35 corresponding to cut-out 34 in receiving device 18. Cut-out 35 permits transmitting device 20 to couple optical signals into optical fiber 14.

FIG. 8 depicts a plan view of another embodiment of the invention in which receiving device 18 and transmitting device 20 are positioned one in front of the other, versus side-by-side as in the arrangements shown in FIGS. 2 through 7. Transmitting device 20 is disposed between associated filter 22 and optical fiber 14. In this arrangement, the optical loss surface for coupling optical signals between optical fiber 14 and receiving device 18 remains restricted to the actual effective optical surface 30 of transmitting device 20. Because transmitting device 20 has a very small area, receiver 18 receives virtually all of the incoming power. The power loss approaches zero, and, at most, is within the range of about 0.5 dB when a diameter of transmitting device 20 corresponds, for example, to ⅓ of a diameter of optical fiber 14.

FIG. 9 shows an optical signal transmission and reception arrangement 10 having two transceivers 16, 16' configured in accordance with the exemplary embodiment illustrated in FIG. 8. Filter 22 of transceiver 16 blocks optical signals of wavelength $\lambda_1$ emitted by transmitting device 20 of transceiver 16. At the same time, filter 22' permits optical signals of wavelength $\lambda_2$ emitted by transmitting device 20' of transceiver 16' to pass through. The transmittance in relation to wavelength of filter 22 of transceiver 16 is clarified in FIG. 9a.

FIG. 9b clarifies the transmittance in relation to wavelength of filter 22' of transceiver 16'. Filter 22' of transceiver 16' is transparent to optical signals of wavelength $\lambda_1$ transmitted from transmitting device 20 of transceiver 16. At the same time, filter 22' blocks optical signals of wavelength $\lambda_2$ from transmitting device 20' of transceiver 16'. Thus, receiving devices 18, 18' and transmitting devices 20, 20', in conjunction with filters 22, 22', enable bidirectional transmission of optical signals, while at the same time permitting employment of a wavelength division multiplex (WDM) to enhance dynamic performance.

FIG. 10 illustrates the relative signal power level ratios that may arise in a bidirectional operation of arrangement 10 shown in FIG. 9. The optical signal power of wavelengths $\lambda_1$ and $\lambda_2$ is shown for each direction. Initially, optical signals of wavelengths $\lambda_1$ or $\lambda_2$ are launched by transmitting devices 20, 20' with maximum power into optical fiber 14. Since at this instant, the power loss is 0, the relative level is 0 dB. Transmission losses which occur when optical signals are transmitted over transmission route 12 result in power losses in the optical signals received at the oppositely disposed receiving devices 18, 18'. These power losses are influenced by, among other things, the so-called near-end crosstalk losses 40 or 42.

When optical signals are launched by transmitting devices 20, 20' into optical fiber 14, reflections are produced. These reflections are determined, for example, by the end face, or effective optical surface 26, of optical fiber 14. Without filters 22, 22', a relatively small signal-to-interference ratio A results, resulting in substantial system degradation. A relatively large signal-to-interference ratio B results when filters 22, 22' are used. This is because near-end crosstalk 40 or 42 is reduced by filtering from receiving devices 18 and 18' optical signals having wavelengths $\lambda_1$ or $\lambda_2$, respectively, these wavelengths being transmitted from associated transmitting devices 20 and 20', respectively. In this way, system degradation may be drastically reduced.

What is claimed:

1. An arrangement for the bidirectional transmission and receiving of optical signals, the arrangement comprising:

at least one transmitting device;

at least one receiving device; and an optical fiber for transmitting the optical signals, wherein the at least one transmitting device and the at least one receiving device are assigned directly to an effective optical area of the optical fiber.

2. The arrangement as recited in claim 1 wherein the at least one transmitting device and the at least one receiving device are positioned side by side.

3. The arrangement as recited in claim 2 wherein the at least one receiving device has a cut-out, the at least one transmitting device being disposed in the cut-out.

4. The arrangement as recited in claim 3 wherein the cut-out is circular and disposed at the center of the at least one receiving device.

5. The arrangement as recited in claim 1 wherein the effective optical area includes an end face of the optical fiber.

6. The arrangement as recited in claim 1 wherein the at least one transmitting device is positioned in front of the at least one receiving device.

7. The arrangement as recited in claim 1 wherein the at least one transmitting device includes a first and a second transmitting device and further comprising a filter assigned to the at least one receiving device, the filter blocking optical signals of a first wavelength from the first transmitting device, the filter permitting optical signals of a second wavelength from the second transmitting device to pass through.

8. The arrangement as recited by claim 1 wherein the optical fiber is a single-mode fiber.

9. The arrangement as recited in claim 1 wherein the optical fiber is a multi-mode fiber.

10. The arrangement as recited in claim 1 wherein the optical fiber is an optical polymer fiber.

11. The arrangement as recited in claim 10 wherein a diameter of the optical fiber is about 1 mm.

* * * * *